(12) United States Patent
Brandt (10) Patent No.: US 9,974,313 B2
(45) Date of Patent: May 22, 2018

(54) METHOD AND APPARATUS FOR PRODUCING BAKED PRODUCTS

(76) Inventor: Francis X. Brandt, Bellerose, NY (US)

(*) Notice: Subject to any disclaimer, the term of this patent is extended or adjusted under 35 U.S.C. 154(b) by 0 days. days.

(21) Appl. No.: 13/210,352

(22) Filed: Aug. 15, 2011

(65) Prior Publication Data
US 2012/0093987 A1    Apr. 19, 2012

Related U.S. Application Data

(62) Division of application No. 11/198,517, filed on Aug. 5, 2005, now Pat. No. 7,998,516.

(51) Int. Cl.
*A21D 2/00* (2006.01)
*A21B 3/13* (2006.01)

(52) U.S. Cl.
CPC ............... *A21B 3/132* (2013.01); *A21B 3/139* (2013.01)

(58) Field of Classification Search
CPC .......... A23G 3/2023; A23G 9/48; A21D 8/02; B67B 7/38
USPC .... 7/110; 426/279, 280, 496, 497, 505, 512, 426/523
See application file for complete search history.

(56) References Cited

U.S. PATENT DOCUMENTS 5,365,833 A * 11/1994 Chen ............................. 99/447
2006/0175527 A1* 8/2006 Morgan ...................... 249/139

* cited by examiner

*Primary Examiner* — Brent T O'Hern
(74) *Attorney, Agent, or Firm* — Wechsler & Wechsler, P.C.; Lawrence I. Wechsler (57) ABSTRACT

A baking mold consists of a first exterior element having at least one first baking cavity, a second exterior element having at least one second baking cavity, and an intermediate supportive element having at least one operational channel. The intermediate supportive element is disposed between the first and second exterior elements in such a manner that the first and second baking cavities and the operational channel form a continuous baking chamber adapted to accommodate a baked product.

20 Claims, 8 Drawing Sheets

METHOD AND APPARATUS FOR PRODUCING BAKED PRODUCTS

CROSS REFERENCE TO RELATED APPLICATIONS

This application is a divisional application of co-pending application Ser. No. 11/198,517 filed Aug. 5, 2005 entitled METHOD AND APPARATUS FOR PRODUCING BAKED PRODUCTS, the entirety of which is incorporated herein by reference.

FIELD OF THE INVENTION

This invention relates in general to a method and apparatus for producing baked products, and in particular, it relates to a method and apparatus for baking muffins and the like having a crust formation at multiple exterior portions thereof.

BACKGROUND OF THE INVENTION

Baked dough products are among the most popular foods in the western world and have been increasingly popular in Asia. The ability to manipulate the quality and shape of baked dough products is a major challenge and an extremely important task to the food industry.

To bake a dough product, the development stage first kneads and shapes the dough until it reaches a desired raw specific volume. Shaping the dough to a pre-determined geometry and weight, and placing the dough within a baking pan or mold comes next. Then, baking at a constant temperature (350° F.-380° F.) for a period of time until the exterior surface of the dough reaches a golden brown color accompanied by formation of a crust finishes the process.

Muffins are distinguished from other baked products such as cakes, cookies, and the like by their geometry which typically includes one outer region having a semi-spherical shape. Muffins are characterized by a brief baking time, a leavening affected by baking powder, and a cellular texture. Another important feature of muffins, particularly cherished by many consumers, is having a tasty crust formed, typically, on the top surface.

Traditional baking pans or molds, whether made from metal or another material, define and limit the shape of a muffin. Due to the difference in the heat transfer rate between the bottom portion of the dough because of its contact with the baking pan, and the rest of the dough, the bottom layer of the baked product is normally overheated so that the color is darker than the desired golden brown. A crust, considered by many to be the most tasteful and delicious part of the muffin, is typically formed only at one area thereof which is directly exposed to the outside heat during the baking process. Obviously, it is very desirable to produce or bake a muffin having crust formed on other major surfaces of such a product. However, the ability to manipulate a muffin or similar baked dough products so as to extend the area of crust formation to multiple surfaces thereof has not been disclosed by prior art.

Thus, it has been a long-felt and unsolved need to provide a method and apparatus for creation of a baked product in general having first and second outer opposing regions and an intermediate region formed therebetween, wherein a crust is formed at the opposing exterior regions of the baked product. More specifically, there has been a need for a method and apparatus to facilitate baking of a muffin or other baked products having a crust formation developed at least at two opposing exterior surfaces thereof.

SUMMARY OF THE INVENTION

One aspect of the invention provides a method of making a baked product having first and second outer regions opposing each other and an intermediate region interposed therebetween in a baking mold consisting of a first exterior element having at least one baking cavity, the second exterior element having at least one baking cavity, and an intermediate supportive element disposed between the first and second exterior elements and having at least one operational channel, so that at least one first and second baking cavities and at least one operational channel define at least one continuous baking chamber. The method consists of the following steps: Injecting at least one baking chamber with unsolidified dough so as to form the first and second outer regions and the intermediate region of the product; exposing at least one baking chamber of the mold to an outside heat causing initial baking and solidifying the dough within the baking chamber; removing the first and second exterior elements from the baking mold, so as to directly expose oppositely positioned first and second outer regions of the product to an outside heat; and continuing baking of the product causing formation of a crust on the first and second oppositely positioned outer regions.

As to another aspect of the invention, the method of removing the first and second exterior elements from the baking mold, the product is self-supported through the intermediate region situated within the operational channel of the intermediate supportive element. In the step of exposing the baking chamber to an outside heat, formation of the crust is prevented in the first and second outer regions of the baked product.

As to a further aspect of the invention, the method includes a step of detecting the condition of the dough within the baking chamber prior to the step of removing the first and second exterior elements from the baking mold. The supportive element is formed by at least a pair of supportive members movably connected to each other, each having at least one recess, each having a combination of respective openings, whereby in the step of ejecting, the supportive members are separated from each other, facilitating ejection of the baked product from the intermediate supportive element.

In still another aspect of the invention, in the step of detecting, upon detecting the predetermined degree of viscosity of the dough within the baking chamber, a signal is generated causing separation of the pair of supportive members.

As to still a further aspect of the invention, a baking mold is provided having at least one first baking cavity, having at least one second baking cavity, and having an operational channel The supportive element is disposed in such a manner that the first and second baking cavities and the operational channel forms a continuous chamber adapted to form a baked product.

As to still another aspect of the invention, a detecting arrangement is provided within the baking chamber, upon detecting a certain viscosity of the dough within a baking chamber, a signal is generated causing separation of the supportive members.

BRIEF DESCRIPTION OF THE DRAWINGS

The foregoing summary as well as the following detailed description of the preferred embodiments of the present invention will be best understood when considered in conjunction with the drawings in which.

DESCRIPTION OF THE PREFERRED EMBODIMENT

Referring now to the drawings in general, and specifically to the views of FIGS. 1, 2 and 11-13, which show a baking mold or apparatus of the invention. As clearly illustrated in FIG. 1, the baking mold 10 consists of spaced from each other, first and second exterior elements or trays 12 and 16 respectively (referred to also as a first exterior mold portion 12 and a second exterior mold portion 16), with an intermediate supportive element or tray 14 (referred to also as an intermediate supportive mold portion 14) being interposed therebetween. The first exterior element 12 is provided having a substantially flat base 18 with an outer shell forming one or multiple substantially hollow first baking cavities 20 having an open end and extending outwardly therefrom. The design of the second exterior element or tray 16 is substantially similar to that of the exterior element 12. That is, one or multiple second baking cavities 22 extend outwardly from a substantially flat base 24 of the second tray or exterior element.

Figure 2:
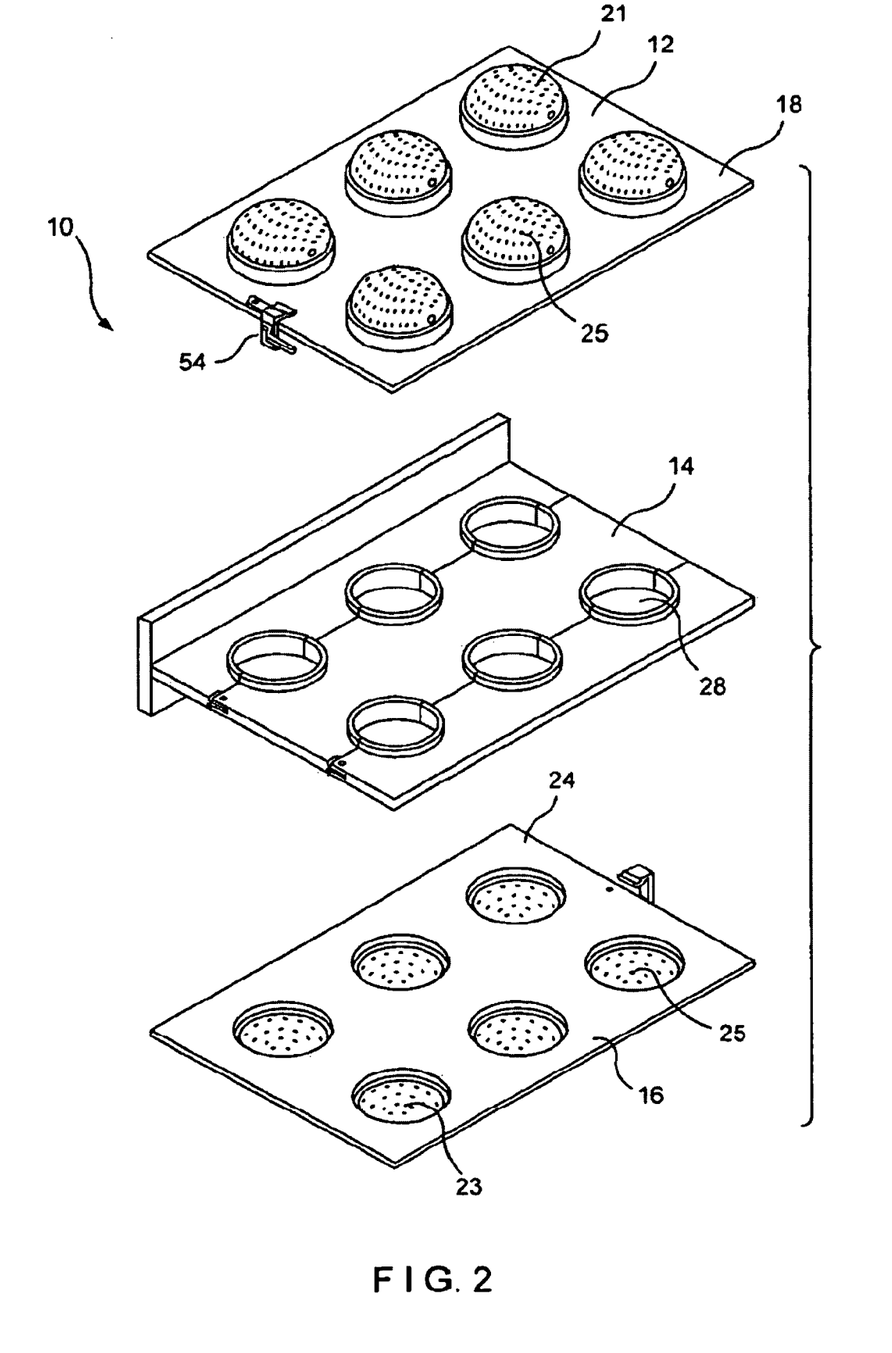
FIG. 2 is an exploded view showing another embodiment of the baking mold with baking cavities formed from a mesh-like material.

In the initially assembled condition of the apparatus of the invention (see FIGS. 2-6), each second baking cavity 22 is positioned, so as to substantially mirror the respective first baking cavities 20 of the first exterior element. While the first and second baking elements or trays 12, 16 have been depicted with six baking cavities having the shape of semi-spherical hemispheres, it should be clear that a tray with any reasonable number of such cavities is within the scope of the invention. In the alternative embodiments of the invention, while the open ends of the cavities are being retained, the first and second cavities themselves may contain varied configurations to produce a baked product with substantially different shaped and sized hemispheres, while still forming crust around the respective exterior portions of the baked product. In an alternative embodiment, as illustrated in FIG. 2, the solid outer shell of the baking cavities 20, 22 is replaced with a mesh screen 21. In this manner, the shells of the respective baking cavities are formed with a multiplicity of small apertures facilitating the escape of moisture and preventing a buildup of air pressure.

The intermediate supportive element 14 is provided having a substantially flat body with one or multiple operational channels 26 extending therethrough and positioned so as to interconnect respective cavities of the first and second exterior elements or trays. In this manner, as best illustrated in FIGS. 3-6, a baking mold with one or multiple continuous baking chambers 30 is formed. To facilitate the formation of a seal between the above-discussed elements, lips 32 can be provided, extending outwardly in both directions from the outer periphery of each operational channel The lips fit snugly and tightly into the cavity of the first and second trays or exterior elements to form a seal, completing a tight interior of the baking chamber.

In the preferred embodiment of the invention, the intermediate supportive element 14 is provided with a support 34 extending substantially normally to its body. As best illustrated in FIGS. 3-9, the entire apparatus is supported by and extends vertically from the support, when placed in an oven or other heat source. In the alternative, the support may be formed as a separate piece or formed as a perpendicular portion of any combination of the exterior elements or intermediate supportive element 14. The baking mold of the invention may also be formed without a supportive element and instead, the tray may rest upon the first or second exterior element.

Figure 12:
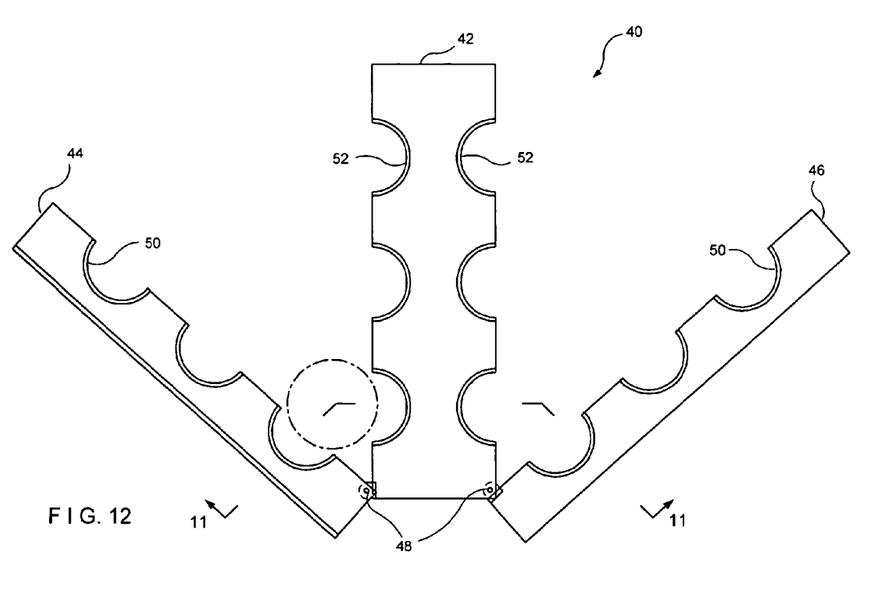
FIG. 12 illustrates an open position of the embodiment of the supportive element shown in FIG. 1.
Figure 13:
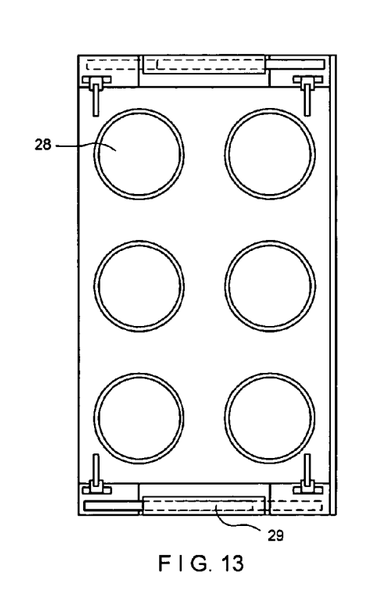
FIG. 13 shows another embodiment of the intermediate supportive element in a closed position.
Figure 14:
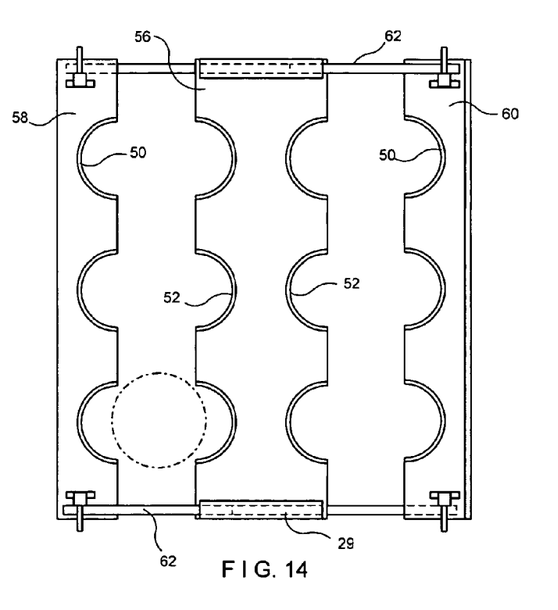
FIG. 14 illustrates the intermediate supportive element depicted in FIG. 13 in the open position.

Turning now to FIGS. 12-14 which illustrate further embodiments of the intermediate supportive elements provided to facilitate the removal of the baked products from the apparatus of the invention at the final steps of the method. As illustrated in FIG. 12, in this embodiment the intermediate supportive element assembly 40 consists of at least a pair of the supportive members movably connected to each other by the pivotal unit at the bottom of the assembly.

More specifically, as illustrated in the embodiment of FIG. 12, the intermediate supportive assembly 40 includes structural portions movable with respect to one another, and which, in the depicted example of FIG. 12, consist of a central intermediate member 42 with two side members 44 and 46 pivotally connected to each other by a pivotal connection 48. The side supportive members 44, 46 are formed with a plurality of recesses 50. In a similar manner, the central intermediate member 42 is provided with a plurality of recesses 52. In the assembled condition (see FIG. 1, for example), the central and side intermediate members are engaged so that the corresponding pairs of recesses 50, 52 form the respective operational channels 28. In this condition of the assembly, the intermediate members are kept together in a closed position by latches or any other conventional connecting arrangements 54. In the final steps of the method of the invention, the connecting arrangements 54 are released so as to allow pivotal movement of the intermediate members with respect to each other by use of hinges or similar mechanism 48. Upon separation of the intermediate supportive members 42, 44 and 46, and the operational channels 28 formed therebetween, to an open position shown in FIG. 12, the finally baking product can be easily removed from the baked mold.

In the embodiments of FIGS. 13 and 14, the design of the central 56 and side intermediate members 58, 60 is similar to the design of such members illustrated in FIG. 12. However, in FIGS. 13 and 14, the intermediate members are slidably connected to each other by means of rods 62 and the like. At the final steps of the baking process, through a hydraulic 29 or any other similar means, the side intermediate elements 58, 60 are separated from the central member 56, releasing the baked products from their engagement with the respective operational channels of the baking mold of the invention.

Figure 3:
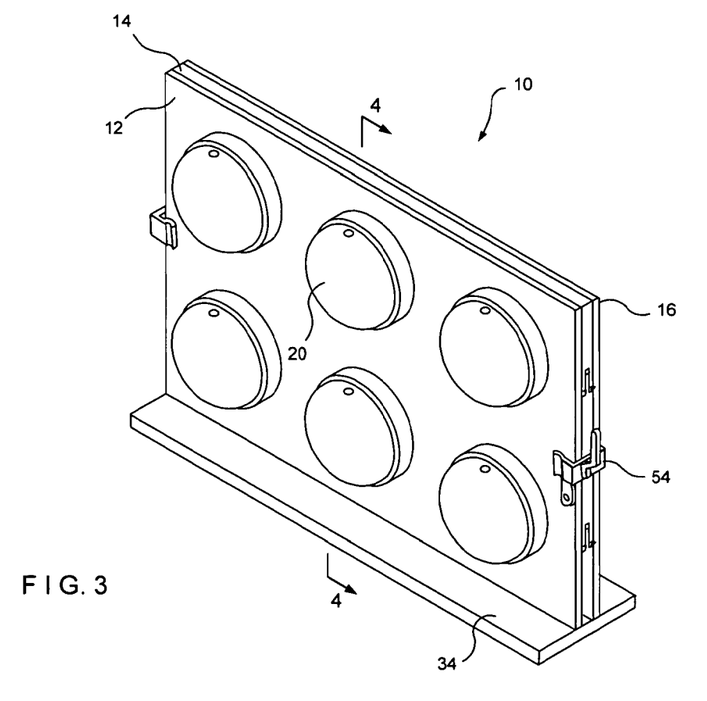
FIG. 3 shows a baking mold in an assembled condition.

In the assembled condition of the baking mold 10, the first exterior element 12 (also referred to as the first exterior mold portion 12), intermediate supportive element 14 (also referred to as the intermediate supportive mold portion 14), and second exterior element 16 (also referred to as the second exterior mold portion 16), as best illustrated in FIG. 3, are placed together and removably held together snugly by a connecting arrangement 54. The connecting arrangement 54 can be of any conventional nature such as a releasable latching or clamping device operationally associated with the respective elements (mold portions), thereby maintaining the first exterior mold portion 12, the second exterior mold portion 16 and the intermediate supportive mold portion 14 in an assembled condition, as shown, for example, in FIG. 3. Thus, the first exterior element, intermediate supportive element, and second exterior element have interconnected and substantially sealed joints, forming a multiplicity of continuous baking chambers 30 adapted for injection with dough.

Figure 4:
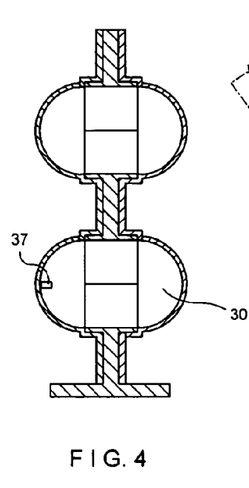
FIG. 4 is a sectional view according to sectional line 4-4 of FIG. 3.
Figure 7:
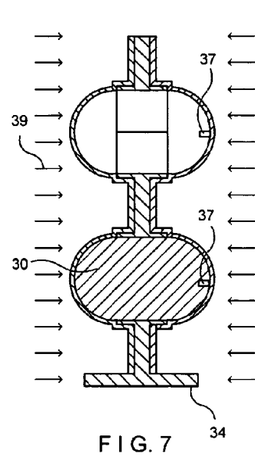
FIG. 7 illustrates initial baking of the dough in the baking chamber.
Figure 8:
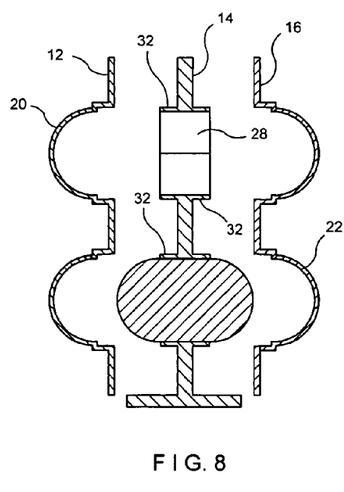
FIG. 8 illustrates the step of separation of the exterior elements from the mold.

As best illustrated in FIGS. 4 and 7, to facilitate industrial use of the apparatus of the invention, a probe or detecting arrangement 37 is provided within at least one baking chamber and is adapted to detect the degree of readiness of the baked product. More specifically, one of the main purposes of such an arrangement is to determine the viscosity of the dough within the baking chambers during the baking process. As will be discussed hereinbelow, upon reaching a certain degree of viscosity, the product being baked within the baking chamber becomes solid enough to be self-supportive within the openings of the intermediate element.

Figure 9:
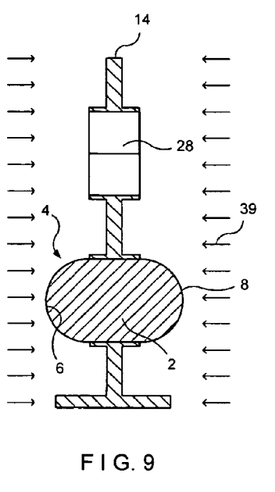
FIG. 9 illustrates a further step of baking after removal of the exterior elements.
Figure 10:
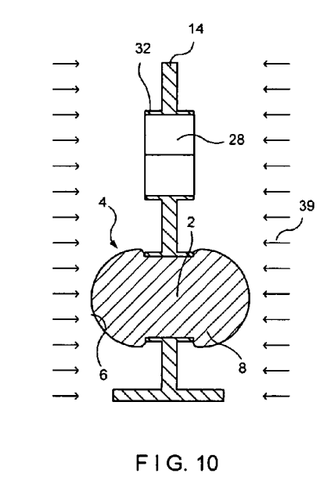
FIG. 10 depicts a product at the final stages of baking within the intermediate element.

At this time, a signal is generated by the detecting arrangement 37 ultimately causing separation of the first 12 and second 16 exterior elements from the intermediate element 14. As such, as best illustrated in FIGS. 9 and 10, the central regions 2 of the baking products 4 are supported by the operational channels 28 of the intermediate supportive member. In this manner, the exterior regions 6, 8 of the baked products, previously disposed within the respective baking cavities 20, 22 of the first and second baking trays, are now directly exposed to the outside heat. In one embodiment of the invention, the detecting arrangement can be in the form of a thermometer capable of identifying a predetermined temperature of the dough within the baking chamber.

The detecting arrangement 37 may include a signaling device, such as for example, an auditory device. Upon detecting that a predetermined temperature or desired degree of viscosity of the dough within the baking chamber has been reached, so as the baked product is self-supportable within the openings of the intermediate element, an auditory signal is generated informing an operator to initiate separation of the exterior elements from the mold. In a further embodiment, a digital display, showing the current viscosity of the dough inside the baking chamber is incorporated into the detecting arrangement.

The detecting arrangement can also include a programmable device whereby a visual and/or audio signal is generated based on a viscosity level (or temperature) chosen by the operator. Additionally, preset viscosity levels may be programmed in for different types of dough products such as dough for scones, muffins, bread, and the like. In another embodiment of the invention, the detecting arrangement is associated with a solenoid switch or other means associated with hydraulic devices 29 provided for connecting and disconnecting the exterior elements to and from the intermediate supportive element 14 at the predetermined viscosity.

Figure 1:
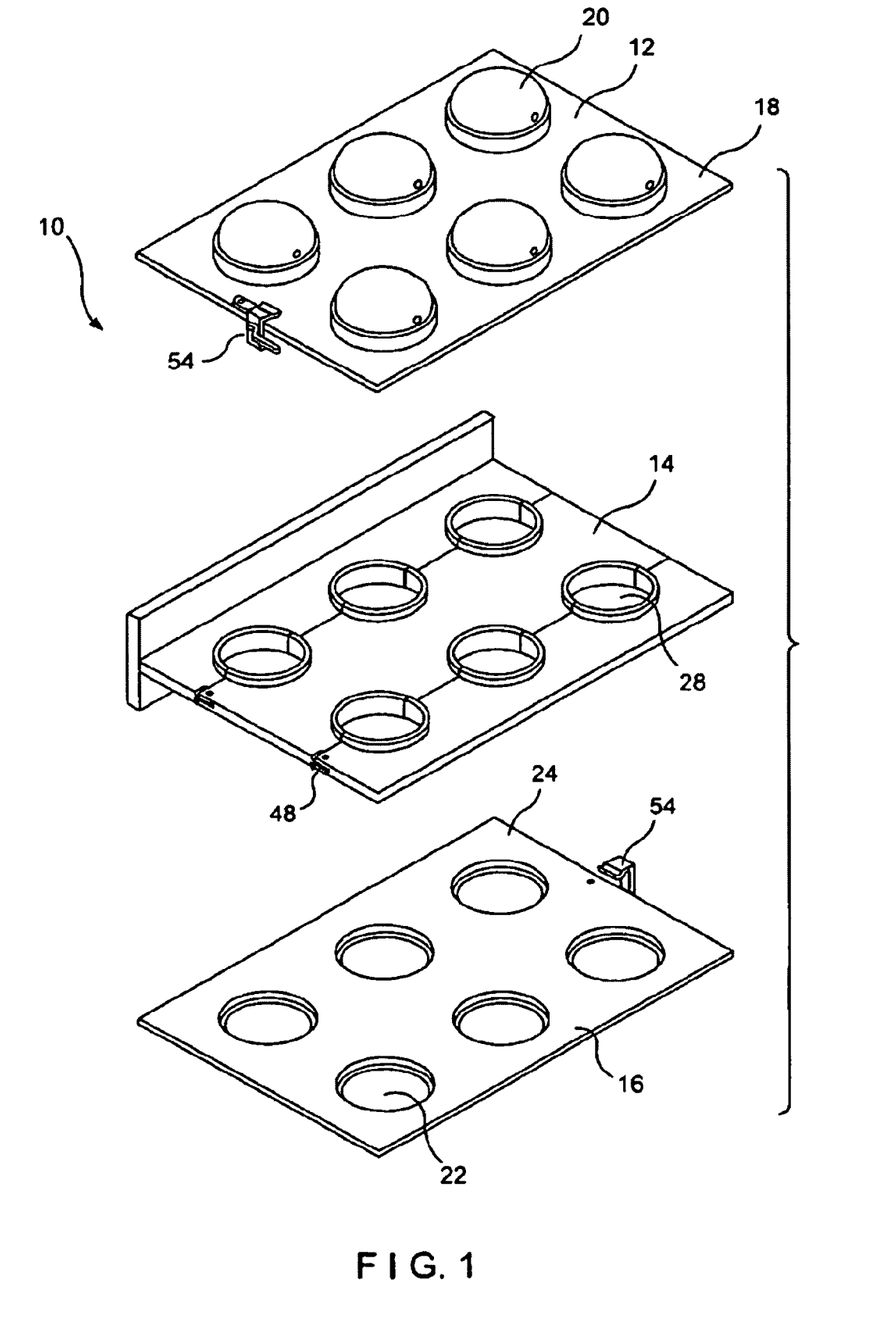
FIG. 1 is an exploded view showing one embodiment of the baking mold of the invention.
Figure 5:
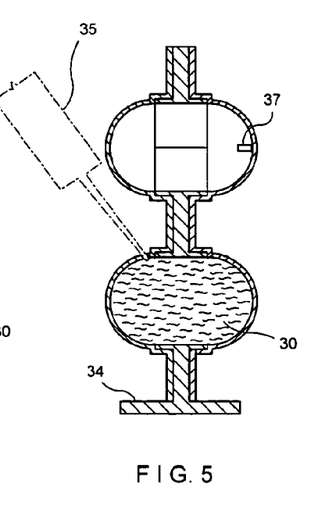
FIG. 5 illustrates a step of injecting a non-solidified dough material into a baking chamber of the mold.

As best illustrated in FIGS. 1, 3 and 5, each baking chamber 30 is provided with an inlet or nozzle 35 used for injection of dough. While the inlet 35 may be of any reasonable size, it in the preferred embodiment of the invention, the inlet is kept as small as possible while still allowing for dough to flow freely into the chamber. Sizes ranging from 4 to 7 mm are preferred and well known in the art.

In the preferred embodiment of the invention, the inlet 35 is placed at one of the outer elements in such a manner that when the tray elements are supported by the base, the inlet of the baking chamber is positioned at the highest elevation, allowing for easy filling with dough, facilitating the escape of gasses, retaining a solidified dough product during the baking process (due to gravitational forces). Alternatively or in addition to this embodiment, the inlet could be positioned at any area of the baking chamber. Another alternative or addition is to provide a method for sealing the inlet, for example, via a valve allowing for the escape of gases but the retaining of solids, namely the dough product. Another example is a plug substantially shaped to seal the inlet or a cover substantially shaped to cover and latch onto the outside of the baking cavity of the outer element.

Figure 6:
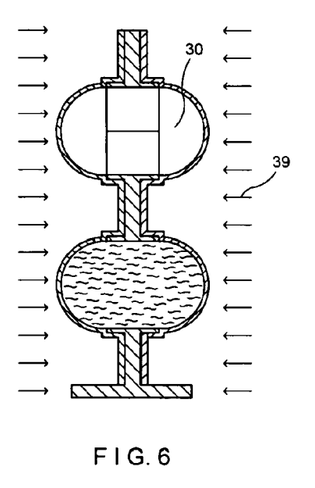
FIG. 6 illustrates the step of exposing the baking mold to an outside heat.

Turning now to FIGS. 4-6 where a first operational condition of the apparatus and the respective step of the method of the invention are depicted. In this condition, dough is injected through the inlet 35 until the baking cavity 30 is filled to a desired volume. While FIGS. 4-6 depict a completely filled baking chamber 30, the dough volume in the chamber may vary depending on conditions such as the desired outcome of the baked product or type of dough used.

Then, as illustrated in FIG. 5, during the next step of the method of the invention, the baking mold 10 of the invention, including operational chambers 30 filed with dough, is placed into an oven 39 or other heat source and the baking process is initiated.

Similar to most baked products, in the preferred embodiment of the invention, the primary ingredient of the dough is flour. However, other dough products made by other substances could be substituted and used in a similar manner in the invention. Wheat flour is typically used because it contains a high amount of gluten, a protein key to the rise of dough. Other flours with lower gluten contents, such as cake, oat, and rye flours may be used or mixed with wheat flour when desired. Doing so may be desirable to change the taste or limit volumetric expansion of the dough as will be explained herein below.

Gluten is a protein strand which is pulled and stretched during the kneading process which builds up long strands of gluten. These gluten strands are then able to efficiently trap water provided by the user and carbon dioxide molecules emitted from yeast. When gluten strands are heated, the protein strands which make up its structure coagulate into an entangled and irreversibly solidifying mesh.

By providing less or more gluten in the dough, as well as varying other factors such as kneading time, amount and type of yeast, water, shortening, and other ingredients in the dough, the volumetric increase of the dough product during baking can be manipulated. Accordingly, the amount of dough injected into each baking chamber 30 would vary based on the type of dough product used. For example, a dough product produced to have a large volumetric increase would require filling the baking chamber 30 only partially, whereas a dough product produced to have a small or negligible volumetric increase require filling the baking chamber 30 mostly or fully with dough.

In alternative embodiments of the invention, the operational inlet 35 could be sealed or fitted with a one-way valve so as to pressure cook the dough product or allow only the escape of gasses from the expanding dough product. As illustrated in FIG. 2, each, or at least one, baking cavity can be formed from a mesh-like material 21. The openings in the mesh are designed to be small enough to allow gas bubbles to escape from the product while preventing a significant amount of dough product from exiting the chamber. The base of the invention may be adapted or a separate tray may be provided to catch any dough overflow.

A critical point is reached when the coagulating gluten strands inside the dough solidify enough to enable the dough product to be supported by the operational channels 28 of the intermediate element 14. Thus, when dough used for the invention is formed to have a small or negligible volumetric increase, the baking cavity should be filled to near-full capacity.

It is desirable for the user to ensure that crust formation does not take place before a stable structure is formed within the baking chambers. In the preferred embodiment of the invention, it is essential to have little or no crust formation before removing the outer elements 12 and 16 of the baking mold and in turn, expose both hemispheres of the baked product directly to the heat source (see FIGS. 8-10).

Typically, crust formation begins near 60° C. (140° F.) whereas gluten becomes rigid near 74° C. (165° F.). This invention brings these two points closer together. As previously discussed, the content of the dough can be modified to lower the point of rigidity, usually by providing high gluten flours. More pertinent to this invention is rising the temperature at which crust formation takes place.

While modern science is not entirely clear why crust formation occurs, we do know that when gas bubbles set on the surface and burst during baking, causing the outer dough to become porous and collapse like a lava lamp while the inner dough is still expanding. The higher external temperature of the inner compared to the outer portions of the dough further causes the outer portions of dough to solidify more quickly.

This crust formation can be manipulated in a variety of ways. First, the baking cavity 30 is provided with a low specific heat and surrounds the dough on all sides, ensuring that gas bubbles will travel and can escape from only one location of the product. This location is at the operational inlet 35. Second, as opposed to the standard practice of pre-heating an oven, the ambient temperature around the baking chamber 30 is raised slowly so as to minimize the difference in temperature between the inside and outside of the dough.

This embodiment of the invention is specifically applicable with the baking mold illustrated in FIG. 2 having baking cavities formed from a mesh-type material which disallows formation of air bubbles. A further addition to the invention is to place the baking apparatus on a rotisserie inside a heat source so that heat is applied in the most even manner to all sides so crust formation is not promoted in any single place since air bubbles will exit near evenly from all sides.

When the appropriate critical point is reached, the detecting arrangement 37 will alert the user or will cause the separation of the outer elements from the baked product. As best illustrated in FIGS. 9 and 10, the dough product is being further baked by the aforementioned heat source, so as to form a crust on the largest possible outer surface of the dough. More specifically, after removing the first and second exterior elements from the baking mold, the first and second outer regions 6, 8 of the product are directly exposed to the heat and the baking process continues, causing formation of crust on the oppositely disposed first and second outer regions. The dough product is baked to a point where the shape will not change substantially and as such, the initial shape of the mold is retained.

Figure 11:
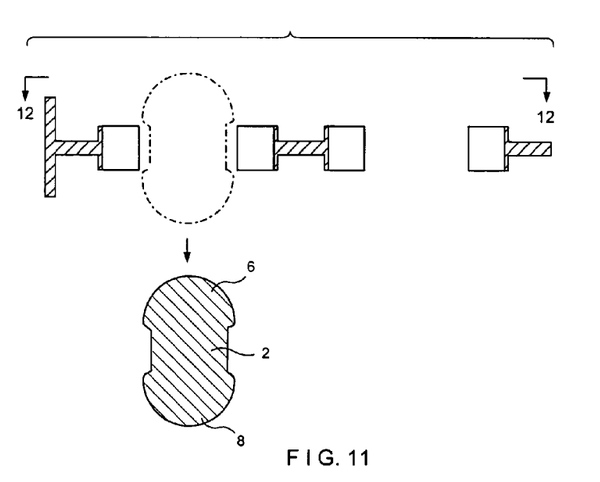
FIG. 11 illustrates ejection of the baked product from the mold.

In a further step of the method of the Invention (see FIG. 10), the members of the intermediate supportive element, as illustrated for example in FIG. 11, are released from their interlocking connection to facilitate removal of the finished baking mold. More specifically, in this embodiment, after receiving a signal from the detecting arrangement, or by another other means, the connection between the central and side intermediate members is terminated by deactivating latches, solenoid, magnetic clamping, or similar mechanisms utilized for this purpose. In this manner, the finally baked products are released from the engagements with the respective operational channels and are ejected from the mold of the invention.

In the embodiments of FIGS. 12 and 13, in order to separate or eject the finally baked products from the baking mold of the invention the connection between the central and side intermediate members or segments is terminated either manually or by means of deactivating magnetic and other connecting arrangements so as to enable the slidable motion of the side intermediate members away from the central member. Upon reaching an open position of the intermediate supportive elements illustrated in FIG. 13, the finally baked products are removed or ejected from the baking mold.

What is claimed is:

1. A baking mold, comprising:
a first exterior element having at least one first baking cavity, a second exterior element having at least one second baking cavity, and an intermediate supportive element having at least one operational channel, said intermediate supportive element being disposed between said first and second exterior elements in such a manner that said first and second baking cavities and said operational channel form a continuous baking chamber adapted to accommodate a baked product, said first and second baking cavities extending outwardly from said intermediate supportive element, said intermediate supportive element comprising at least a pair of supportive members each formed with respective recesses, said supportive members being movable with respect to each other between an open and closed position, so that said respective operational channel is formed by said corresponding recesses when said pair of supportive elements is in said closed position.

2. The baking mold according to claim 1, wherein said intermediate supportive element is formed by at least a pair of supportive members pivotably connected to each other.

3. The baking mold according to claim 1, further comprising a detecting arrangement within said baking chamber operative to detect a condition of dough situated thereinside.

4. The baking mold according to claim 3, wherein said detecting arrangement is further configured to be operative to generate a signal causing separation of said supportive members so as to facilitate removal of the baked product from said mold upon detecting a predetermined degree of viscosity of the dough within said at least one baking chamber by said detecting arrangement.

5. The baking mold according to claim 3, wherein said detecting arrangement comprises a thermometer.

6. The baking mold according to claim 1, wherein said first and second baking cavities each comprises a mesh.

7. The baking mold according to claim 1, wherein said intermediate supportive element includes a generally flat main body portion.

8. The baking mold according to claim 1, wherein at least one of said at least one first baking cavity and said at least one second baking cavity has a shape of a semi-spherical hemisphere.

9. The baking mold according to claim 1, wherein at least one of said at least one first baking cavity and said at least one second baking cavity is formed as a shell including a multiplicity of apertures.

10. The baking mold according to claim 1, wherein said intermediate supportive element is formed by at least a pair of supportive members slidably connected to each other.

11. The baking mold according to claim 1, wherein said continuous baking chamber includes an inlet or nozzle used for injecting of dough.

12. The baking mold according to claim 11, wherein the inlet or nozzle is disposed in at least one of said a first exterior element or said second exterior element.

13. The baking mold according to claim 11, further comprising:
a base on which said first exterior element, said second exterior element and said intermediate supportive element are supportable during a baking process; and
the inlet or nozzle is disposed at a highest elevation of the continuous baking chamber from said base allowing ease of filling with the dough and facilitated escape of gases during a baking process.

14. The baking mold according to claim 10, wherein at least a pair of supportive members are hydraulically moved between said open and said closed positions.

15. The baking mold according to claim 1, further comprising lips extending outwardly in opposed directions from an outer periphery of said operational channel.

16. A baking mold, comprising:
a first exterior tray including at least one first baking cavity;
a second exterior tray including at least one second baking cavity; and
an intermediate supportive tray including at least one operational channel extending through said intermediate supportive tray, said intermediate supportive tray being receivable between said first exterior tray and said second exterior tray, such that when so received, each said at least one operational channel interconnects a one of said at least one first baking cavity and a respective one of said at least one second baking cavity so as to collectively form a continuous baking chamber, said intermediate supportive tray being comprised of structural portions movable with respect to one another between a closed position in which the operational channel is collectively defined by the structural portions and an open position which facilitates removal of a baked product from the baking mold.

17. The baking mold according to claim 16, wherein:
said intermediate supportive tray includes a generally flat main body portion; and
said intermediate supportive tray further includes a support arranged orthogonal to a planar extent of said main body portion.

18. A baking mold, comprising:
a first exterior tray including at least one first baking cavity;
a second exterior tray including at least one second baking cavity; and
an intermediate supportive tray including at least one operational channel extending through said intermediate supportive tray, said intermediate supportive tray being receivable between said first exterior tray and said second exterior tray, such that when so received, each said at least one operational channel interconnects a one of said at least one first baking cavity and a respective one of said at least one second baking cavity so as to collectively form a continuous baking chamber said first and second baking cavities each comprising a mesh.

19. A baking mold, comprising:
a first exterior mold portion including at least one first baking cavity;
a second exterior mold portion including at least one second baking cavity; and
an intermediate supportive mold portion including at least one operational channel extending through said intermediate supportive mold portion, said intermediate supportive mold portion being receivable between said first exterior mold portion and said second exterior mold portion, such that when so received, each said at least one operational channel interconnects a one of said at least one first baking cavity and a respective one of said at least one second baking cavity so as to collectively form a continuous baking chamber, said first exterior mold portion, said second exterior mold portion and said intermediate supportive mold portion being removably held together in a manner maintaining said first exterior mold portion, said second exterior mold portion and said intermediate supportive mold portion in an assembled condition.

20. The baking mold according to claim 19, further comprising a connecting arrangement operable to removably maintain said first exterior mold portion, said second exterior mold portion and said intermediate supportive mold portion in said assembled condition during a baking operation.

* * * * *